United States Patent
Ackley et al.

(10) Patent No.: US 8,023,746 B2
(45) Date of Patent: Sep. 20, 2011

(54) SYSTEMS AND METHODS FOR DECODING AN IMAGE TO DETERMINE A DIGITAL IDENTIFIER

(75) Inventors: Jonathan M. Ackley, Glendale, CA (US); Jason Dubin, Stevenson Ranch, CA (US); Nuria E. Romero, Los Angeles, CA (US); Amy K. Van Gilder, Los Angeles, CA (US); Jay D. Williams, Canyon Country, CA (US); Oren R. Aviv, Hidden Hills, CA (US); Alexis P. Wieland, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1435 days.

(21) Appl. No.: 11/249,505

(22) Filed: Oct. 14, 2005

(65) Prior Publication Data

US 2007/0084928 A1    Apr. 19, 2007

(51) Int. Cl.
*G06K 9/46* (2006.01)
(52) U.S. Cl. .............. 382/232; 382/181; 235/162.08; 235/162.11; 345/555; 358/426.01; 358/426.16; 375/240
(58) Field of Classification Search ............ 382/181, 382/232; 235/462.08, 462.11; 345/555; 358/426.01–426.16; 375/240
See application file for complete search history.

(56) References Cited

U.S. PATENT DOCUMENTS

| | | | |
|---|---|---|---|
| 5,321,520 A | 6/1994 | Inga et al. | |
| 5,384,643 A | 1/1995 | Inga et al. | |
| 5,905,251 A | 5/1999 | Knowles | |
| 5,933,829 A | 8/1999 | Durst et al. | |
| 5,978,773 A | 11/1999 | Hudetz et al. | |
| 5,992,752 A | 11/1999 | Wilz, Sr. et al. | |
| 6,027,024 A | 2/2000 | Knowles | |
| 6,108,656 A | 8/2000 | Durst et al. | |
| 6,144,848 A | 11/2000 | Walsh et al. | |
| 6,152,369 A | 11/2000 | Wilz, Sr. et al. | |
| 6,199,048 B1 | 3/2001 | Hudetz et al. | |

(Continued)

FOREIGN PATENT DOCUMENTS

EP    1104174 A1 *  5/2001

OTHER PUBLICATIONS

PCT International Search Report and Written Opinion dated Jun. 24, 2008, in International application No. PCT/US2007/19609 (11 pages).

(Continued)

*Primary Examiner* — Bhavesh Mehta
*Assistant Examiner* — Eueng-Nan Yeh
(74) *Attorney, Agent, or Firm* — Finnegan, Henderson, Farabow, Garrett & Dunner LLP

(57) ABSTRACT

A method is provided for decoding an image of a pattern on an object to determine a digital identifier. An image of a pattern on the object is received. The image includes a plurality of pixels, each of the pixels having an optical attribute with a corresponding value. The image is divided into a plurality of tiles, each of the tiles containing a contiguous plurality of the pixels of the image. A digital bit is assigned to each of the tiles based on the values of the optical attribute of the pixels in the tile. A digital identifier is determined based on the digital bits assigned to the tiles.

70 Claims, 11 Drawing Sheets

U.S. PATENT DOCUMENTS

| | | | |
|---|---|---|---|
| 6,338,434 | B1 | 1/2002 | Wilz, Sr. et al. |
| 6,345,764 | B1 | 2/2002 | Knowles |
| 6,419,638 | B1 * | 7/2002 | Hay et al. ............... 600/558 |
| 6,430,554 | B1 | 8/2002 | Rothschild |
| 6,434,561 | B1 | 8/2002 | Durst, Jr. et al. |
| 6,464,139 | B1 | 10/2002 | Wilz, Sr. et al. |
| 6,505,776 | B1 | 1/2003 | Wilz, Sr. et al. |
| 6,507,868 | B2 | 1/2003 | Simmon et al. |
| 6,510,997 | B1 | 1/2003 | Wilz, Sr. et al. |
| 6,519,525 | B2 | 2/2003 | Namba |
| 6,542,933 | B1 | 4/2003 | Durst, Jr. et al. |
| 6,604,681 | B1 | 8/2003 | Burke et al. |
| 6,629,642 | B1 | 10/2003 | Swartz et al. |
| 6,651,053 | B1 | 11/2003 | Rothschild |
| 6,675,165 | B1 | 1/2004 | Rothschild |
| 6,707,581 | B1 | 3/2004 | Browning |
| 6,738,630 | B2 | 5/2004 | Ashmore |
| 6,766,363 | B1 | 7/2004 | Rothschild |
| 6,834,804 | B2 | 12/2004 | Rathus et al. |
| 6,865,608 | B2 | 3/2005 | Hunter |
| 6,866,196 | B1 | 3/2005 | Rathus et al. |
| 6,993,573 | B2 | 1/2006 | Hunter |
| 7,023,572 | B2 | 4/2006 | Tuli |
| 7,027,054 | B1 | 4/2006 | Cheiky et al. |
| 7,219,364 | B2 | 5/2007 | Bolle et al. |
| 2002/0003166 | A1 | 1/2002 | Miller et al. |
| 2002/0019819 | A1 | 2/2002 | Sekiguchi et al. |
| 2002/0063717 | A1 * | 5/2002 | Minner et al. ............... 345/557 |
| 2002/0102966 | A1 | 8/2002 | Lev et al. |
| 2002/0165801 | A1 * | 11/2002 | Stern et al. ............... 705/27 |
| 2002/0187774 | A1 | 12/2002 | Ritter et al. |
| 2003/0044068 | A1 | 3/2003 | Kagehiro et al. |
| 2003/0198383 | A1 | 10/2003 | Yamaguchi et al. |
| 2003/0229678 | A1 | 12/2003 | Wen et al. |
| 2004/0003052 | A1 | 1/2004 | Yoda |
| 2004/0014460 | A1 | 1/2004 | Moroo et al. |
| 2004/0042670 | A1 * | 3/2004 | Moroo et al. ............... 382/232 |
| 2004/0046993 | A1 | 3/2004 | Usuda |
| 2004/0110517 | A1 | 6/2004 | Ellman |
| 2004/0203970 | A1 | 10/2004 | Rooke et al. |
| 2005/0011957 | A1 | 1/2005 | Attia et al. |
| 2005/0044179 | A1 | 2/2005 | Hunter |
| 2005/0050165 | A1 | 3/2005 | Hamynen |
| 2005/0052558 | A1 | 3/2005 | Yamazaki et al. |
| 2005/0064900 | A1 | 3/2005 | Goris et al. |
| 2005/0082370 | A1 | 4/2005 | Frantz et al. |
| 2005/0116945 | A1 | 6/2005 | Mochizuki et al. |
| 2005/0256820 | A1 * | 11/2005 | Dugan et al. ............... 706/52 |

OTHER PUBLICATIONS

Kokubo, H., "Advertisement Guidance Service that Uses Positional Information," Oki Technical Review, Issue 198, vol. 71, No. 2 [online], Apr. 2004. Retrieved from the Internet: <URL: http://www.oki.com/en/otr/198/downloads/otr-198-R11.pdf>.

Oki Global, Press Release [online], Feb. 2004. Retrieved from the Internet: <URL: http://www.oki.com/en/press/ov/2004/0402.html>.

Rukzio, E., et al., "A Framework for Mobile Interactions with the Physical World," Sec. 3.2 [online]. Retrieved from the Internet: < URL: http://www.hcilab.org/documents/RukzioWetzsteinSchmidt_AFrameworkForMobileInteractionsWithThePhysicalWorld.pdf>.

Rukzio, E., et al., "An Analysis of the Usage of Mobile Phones for Personalized Interactions with Ubiquitous Public Displays" [online], [retrieved on May 30, 2006]. Retrieved from the Internet: <URL: http://ubicomp.lancs.ac.uk/workshops/ubidisplay04/papers/ubidisplay04-rukzio.pdf>.

Rukzio, E., et al., "Physical Posters as Gateways to Context-aware Services for Mobile Devices" [online]. Retrieved from the Internet: < URL: http://www.ist-simpticity.org/_publications/WMCSA%202004%20Physical%20Posters%20as%20Gateways.pdf>.

Heyman, J., "MMS Decoder," PHP Developer's Network, PHP Classes [online], [retrieved on Aug. 21, 2005]. Retrieved from the Internet: <URL: http://phpclasses.mirrors.nyphp.org/browse/package/1782.html>.

Ehrhart, M., "Adaptus Imaging Technology Delivers Performance and Versatility," Hand Held Products, Inc., Jan. 2005 [online].

"Mobile & Wireless Technology in Food Retailing," PSC White Paper, PSC Inc., 2004 [online]. Retrieved from the Internet: <URL: https://partners.psc.com/marketlit/Send.aspx?file=R40-1006-US>.

Mobot Mobile Visual Serch Technology. Mobot Visual Search [online], [retrieved on Jan. 24, 2006]. Retrieved from the Internet: < URL: http//www.mobot.com/technology.html>. © 2005 Mobot, Inc.

OP3 mCommerce: mobile scanning technology. OP3 ShotCodes [online], [retrieved on Jan. 24, 2006]. Retrieved from the Internet: < URL: http://www.op3.com/en/technology/shotcodes>. © 2003-2005 OP3 AB Sweden.

Rekimoto, J., et al., "CyberCode: Designing Augmented Reality Environments with Visual Tags" [online], Retrieved from the Internet: <URL: http://www.csl.sony.co.jp/person/rekimoto/papers/dare2000.pdf>.

Scanbuy Optical Intelligence foryour mobile devices. Optical Intelligence Technology [online], [retrieved on Jan. 24, 2006]. Retrieved from the Internet <URL: http://www.scanbuy.com/website/technology_overview.html>. © 2004 Scanbuy®, Inc.

Densowave [online], [retrieved on Jan. 24, 2006]. Retrieved from the Internet <URL: http//www.denso-wave.com/en/about/adcd.html>.

Colorzip [online], [retrieved on Jan. 24, 2006]. Retrieved from the Internet <URL: http//www.colorzip.co.jp/en/technology.html>. © 2005 Colorzip Japan Inc.

PCT International Search Report, dated Mar. 20, 2007.

Damera-Venkata, N., et al., "Image Barcodes." Proceedings of the SPIE, SPIE, Bellingham, VA, US, vol. 5008, Jan. 21, 2003, pp. 493-503, XP002314549, ISSN: 0277-786X.

Shaked, D., et al., "Graphical Indicia." Proceedings 2003 International Conference on Image Processing. ICIP-2003, Barcelona, Spain, Sep. 14-17, 2003, International Conference on Image Processing, New York, NY : IEEE, US, Sep. 14, 2003, pp. 485-488, XP010670168, ISBN: 0-7803-7750-8.

* cited by examiner

| Digital Identifier | Information Content |
|---|---|
| 000101111000 | donald.mov |
| 101000010111 | coming soon.wav |
| 111000001111 | track_07.mp3 |
| 111011001011 | activation signal.bin |
| 111100101100 | cover art.jpg |
| 001000011111 | recent items.html |
| ⋮ | ⋮ |

Figure 12

SYSTEMS AND METHODS FOR DECODING AN IMAGE TO DETERMINE A DIGITAL IDENTIFIER

TECHNICAL FIELD

This invention generally relates to decoding an image to determine a digital identifier.

BACKGROUND

Patterns displayed on physical objects can be used to represent digital data. For example, one-dimensional bar codes have been used on external product packaging to identify a type of the product by a digital identifier. However, these bar codes require an area on the packaging dedicated to provide the digital identifier. In addition, the bar codes are typically not aesthetically pleasing to a human observer.

Alternative embodiments use two-dimensional patterns to represent digital data. For example, a "ShotCode," implemented by OP3 AB of Sweden, is a circular pattern that encodes digital data. This circular pattern can be placed on marketing media, such that a person who is interested in the media can photograph the circular pattern to prompt a web browser at the person's disposal to access a particular website.

However, those patterns may occupy an area dedicated to providing the digital identifier that cannot be used for other displays. The patterns can also distract the human user's attention from the physical object, such as the marketing materials.

In yet another embodiment, two-dimensional marketing materials themselves are photographed as an image of low resolution pixels using a digital camera on a cellular telephone. The low resolution image is processed to recognize an identity of the two-dimensional marketing materials. Based on this identity, graphics or other information content can be transmitted to the cellular telephone to a user. However, the processing of the two-dimensional graphic may not be sufficiently robust to recognize its identity in commercial application.

Thus, it is desirable to encode a digital identifier in a pattern on an object that makes efficient use of the surface area of the object. It is further desirable to robustly decode the pattern to determine the digital identifier.

SUMMARY

A method is provided of decoding an image of a pattern on an object to determine a digital identifier. The method comprises receiving an image of a pattern on the object, the image comprising a plurality of pixels, each of the pixels having an optical attribute with a corresponding value. The method further comprises dividing the image into a plurality of tiles, each of the tiles comprising a contiguous plurality of the pixels of the image. The method still further comprises assigning a digital bit to each of the tiles based on the values of the optical attribute of the pixels in the tile. In addition, the method comprises determining a digital identifier based on the digital bits assigned to the tiles.

A system is provided for decoding an image of a pattern on an object to determine a digital identifier. The system comprises a digital camera to generate an image of a pattern on the object, the image comprising a plurality of pixels, each of the pixels having an optical attribute with a corresponding value. The system also comprises a decoder to (i) divide the image into a plurality of tiles, each of the tiles comprising a contiguous plurality of the pixels of the image, (ii) assign a digital bit to each of the tiles based on the values of the optical attribute of the pixels in the tile, and (iii) determine a digital identifier based on the digital bits assigned to the tiles.

A computer-readable medium is provided that contains instructions for configuring a microprocessor to perform a method for decoding an image of a pattern on an object to determine a digital identifier. The method comprises receiving an image of a pattern on the object, the image comprising a plurality of pixels, each of the pixels having an optical attribute with a corresponding value. The method further comprises dividing the image into a plurality of tiles, each of the tiles comprising a contiguous plurality of the pixels of the image. The method still further comprises assigning a digital bit to each of the tiles based on the values of the optical attribute of the pixels in the tile. In addition, the method comprises determining a digital identifier based on the digital bits assigned to the tiles.

A method is provided of decoding an image of a pattern on an object to determine a digital identifier. The method comprises receiving an image of a pattern on the object, the image comprising a plurality of pixels, each of the pixels having an optical attribute with a corresponding value. The method further comprises transmitting the image to a remote server that (i) divides the image into a plurality of tiles, each of the tiles comprising a contiguous plurality of the pixels of the image, (ii) assigns a digital bit to each of the tiles based on the values of the optical attribute of the pixels in the tile, and (iii) determines a digital identifier based on the digital bits assigned to the tiles. The method still further comprises receiving the digital identifier from the remote server.

A system is provided for decoding an image of a pattern on an object to determine a digital identifier. The system comprises a digital camera to generate an image of a pattern on the object, the image comprising a plurality of pixels, each of the pixels having an optical attribute with a corresponding value. The system further comprises a transmitter to transmit the image to a remote server that (i) divides the image into a plurality of tiles, each of the tiles comprising a contiguous plurality of the pixels of the image, (ii) assigns a digital bit to each of the tiles based on the values of the optical attribute of the pixels in the tile, and (iii) determines a digital identifier based on the digital bits assigned to the tiles. The system further comprises a receiver to receive the digital identifier from the remote server.

A computer-readable medium is provided that contains instructions for configuring a microprocessor to perform a method for decoding an image of a pattern on an object to determine a digital identifier. The method comprises receiving an image of a pattern on the object, the image comprising a plurality of pixels, each of the pixels having an optical attribute with a corresponding value. The method further comprises transmitting the image to a remote server that (i) divides the image into a plurality of tiles, each of the tiles comprising a contiguous plurality of the pixels of the image, (ii) assigns a digital bit to each of the tiles based on the values of the optical attribute of the pixels in the tile, and (iii) determines a digital identifier based on the digital bits assigned to the tiles. The method still further comprises receiving the digital identifier from the remote server.

A method is provided of decoding an image of a pattern on an object to determine a digital identifier. The method comprises receiving, from a portable imaging apparatus, an image of a pattern on the object, the image comprising a plurality of pixels, each of the pixels having an optical attribute with a corresponding value. The method further comprises dividing the image into a plurality of tiles, each of the tiles comprising a contiguous plurality of the pixels of the image. The method still further comprises assigning a digital bit to each of the tiles based on the values of the optical attribute of the pixels in the tile. The method also comprises determining a digital identifier based on the digital bits assigned to the tiles.

A system is provided for decoding an image of a pattern on an object to determine a digital identifier. The system comprises a receiver to receive, from a portable imaging apparatus, an image of a pattern on the object, the image comprising a plurality of pixels, each of the pixels having an optical attribute with a corresponding value. The system further comprises a decoder to (i) divide the image into a plurality of tiles, each of the tiles comprising a contiguous plurality of the pixels of the image, (ii) assign a digital bit to each of the tiles based on the values of the optical attribute of the pixels in the tile, and (iii) determine a digital identifier based on the digital bits assigned to the tiles.

A computer-readable medium is provided that contains instructions for configuring a microprocessor to perform a method for decoding an image of a pattern on an object to determine a digital identifier. The method comprises receiving, from a portable imaging apparatus, an image of a pattern on the object, the image comprising a plurality of pixels, each of the pixels having an optical attribute with a corresponding value. The method further comprises dividing the image into a plurality of tiles, each of the tiles comprising a contiguous plurality of the pixels of the image. The method still further comprises assigning a digital bit to each of the tiles based on the values of the optical attribute of the pixels in the tile. The method also comprises determining a digital identifier based on the digital bits assigned to the tiles.

BRIEF DESCRIPTION OF THE DRAWINGS

The accompanying drawings, which are incorporated in and constitute a part of this specification, illustrate embodiments consistent with the present invention and, together with the description, serve to explain the principles of the invention.

FIG. 12 is a table showing an exemplary embodiment of a mapping between digital identifiers and information content.

DESCRIPTION OF THE EMBODIMENTS

Reference will now be made in detail to embodiments of the present disclosure, examples of which are illustrated in the accompanying drawings. Wherever possible, the same reference numbers will be used throughout the drawings to refer to the same or like parts.

Figure 1:
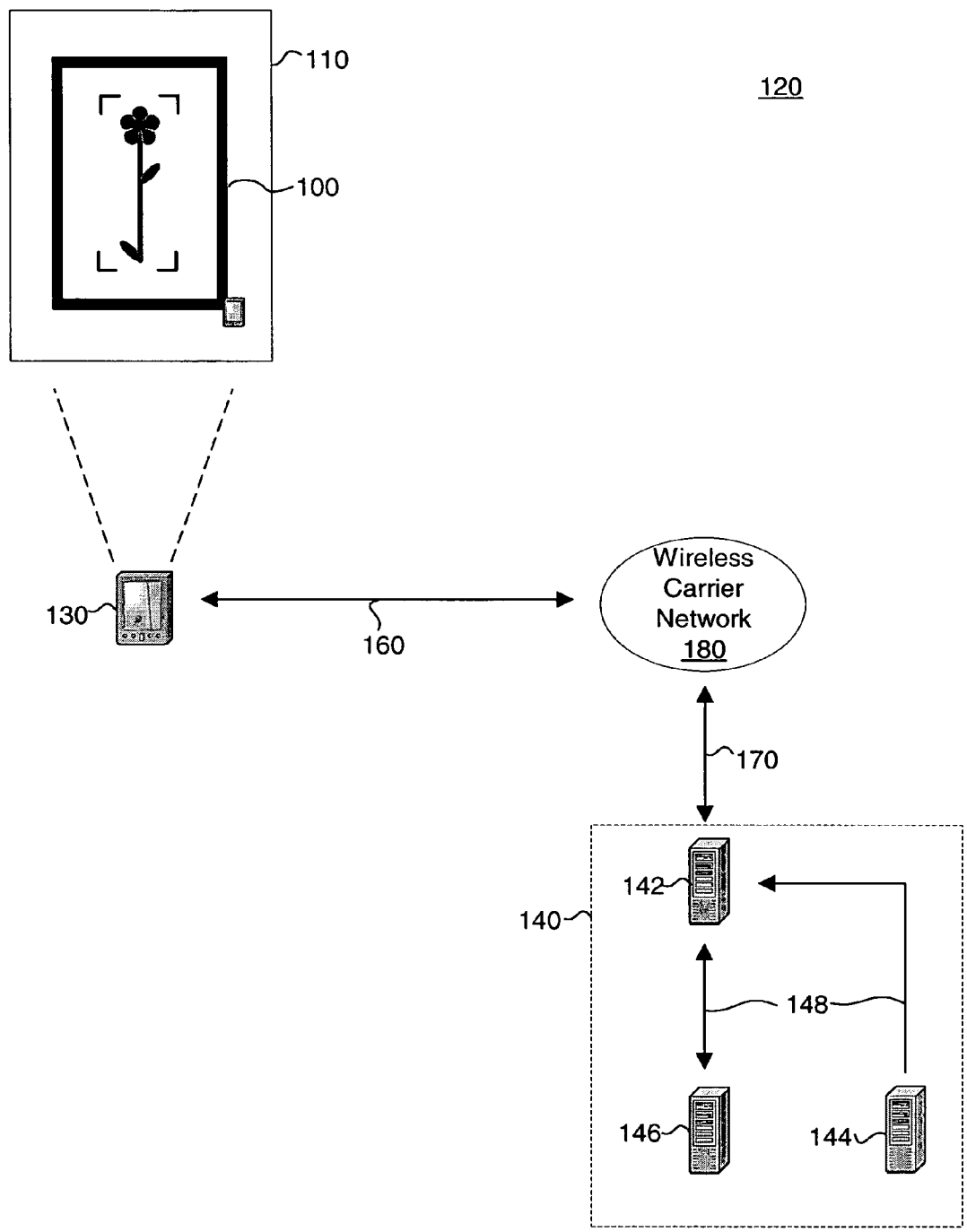
FIG. 1 shows an embodiment of an exemplary content delivery system that includes a portable imaging apparatus and a remote server.

A pattern designed to be displayed on an object may contain an encoded digital identifier associated with relevant information content. The object may comprise, for example, a poster (such as a "one-sheet"), a billboard, a placard, a painting, a drawing, a television screen on which the pattern is displayed, a computer monitor on which the pattern is displayed, a backdrop on which the pattern is projected, apparel (such as t-shirts, hats, shoes, or pockets), a magazine, a newspaper, a retail hang-tag, a digital video disc (DVD) case, a sticker, a ticket, a compact disc (CD) case, a baseball card, or a soda can. The pattern displayed on the object may be two-dimensional, even if the underlying surface of the object is not flat. FIG. 1 shows an exemplary embodiment of a pattern 100 displayed on an object 110.

A content delivery system may be provided to deliver information content associated with pattern 100 on object 110. The information content associated with the digital identifier may comprise visual, auditory, or sensory content, or a descriptor of a location to make such content accessible. For example, the information content may include an image, text, streaming or non-streaming video, streaming or non-streaming audio, a Universal Resource Locator (URL), a Wireless Application Protocol (WAP) page, a Hyper Text Markup Language (HTML) page, an Extensible Markup Language (XML) document, an executable program, a filename, an Internet Protocol (IP) address, a telephone call, a pointer, or other content.

In an illustrative example, object 110 is a storybook having patterns 100 that are symbol codes at locations where one might normally expect to find page numbers. As a human user looks at a page of the storybook, he can use the content delivery system to recognize the symbol code on that page to retrieve multimedia content relating to that page. For example, the content delivery system may play an MPEG-3 audio file that narrates words printed on the page. In another example, the content delivery system plays a video or animation corresponding to the page.

FIG. 1 shows an exemplary embodiment of a content delivery system 120, which comprises a portable imaging apparatus 130 to generate an image, referred to herein as a super-image, of pattern 100 on object 110. The super-image is an electronic representation of pattern 100 on object 110. For example, the image may be a data structure comprising a two-dimensional array of pixel information. Examples of portable imaging apparatus 130 may include any electronic device, such as a cellular telephone ("cell phone"), a personal digital assistant (PDA), a personal computer (PC), a digital camera, or a wireless telephone adapted to operate on a wireless access network, such as a wireless access network operating using an IEEE 802.16 standard (WiMAX) or an IEEE 802.11 standard (Wi-Fi), or an electronically coupled set of two or more of these devices, such as a digital camera that is in wired or wireless communication with a PDA.

Portable imaging apparatus 130 comprises a digital camera, which can be any electronic device capable of generating the super-image of pattern 100 on object 110. For example, the digital camera may comprise either a charge coupled device (CCD) sensor or a complementary metal-oxide-semiconductor (CMOS) sensor, and a set of optical lenses to convey a light pattern onto the sensor and thereby generate the super-image of pattern 100. In one exemplary embodiment, the digital camera is built into a cell phone.

In operation, the user points the digital camera of portable imaging apparatus 130 in a general direction of pattern 100 on object 110, and generates the super-image after capturing an area of object 110 that is covered by pattern 100. The area of object 110 covered by pattern 100 may have a surface that is adapted to be imaged by the digital camera of portable imaging apparatus 130 to generate a super-image that is a sufficiently accurate representation of pattern 100. For example, the surface that displays pattern 100 may be formed, textured, coated, covered, or contoured to enhance the super-image generated by the digital camera. The super-image can thus have a desirably high contrast or a desirably high fidelity of color, hue, saturation, or value. In one exemplary embodiment, the surface has a matte or otherwise glare-reducing finish, even if neighboring surfaces of physical object 110 are glossy, such as due to an ultraviolet coating designed to inhibit fading, or otherwise not optimized to be imaged by the digital camera. The glare-reducing finish can reduce stray reflections of light to the digital camera and thereby result in a higher accuracy of the super-image.

Content delivery system 120 may also comprise a remote server 140 to operate in conjunction with portable imaging apparatus 130 to deliver the information content. Remote server 140 comprises one or more servers 142, 144, and 146, which may be coupled by connections 148 across one or more communications networks, such as a local area network (LAN), an intranet, or the internet. For example, remote server 140 may include one or more of messaging server 142 to handle communications with portable imaging apparatus 130 and deliver the information content, content server 144 to store and maintain the information content, and rules server 146 to determine which information content to deliver. In one embodiment, messaging server 142, content server 144, and rules server 146 may reside at different physical locations and be communicatively coupled via connections 148 over the internet. For example, messaging server 142 may be physically resident at a location managed by a cellular telephone company. Meanwhile, content server 144 and rules server 146 may physically reside at a movie production company, such that content server 144 hosts a website representing a soon-to-be-released movie. Portable imaging apparatus 130 may be coupled to remote server 140 via one or more communications connections 160 and 170, which may include wired electrical links, wireless links, optical links, or other modes of communicative coupling.

In one exemplary version, remote server 140 may be coupled to a wireless carrier network 180 via connection 170, such as an electrical land line, e.g. a T1 or T3 line, an optical land line, or a wireless connection. Wireless carrier network 180 may be operated by a wireless service provider that provides cellular telephony or other digital communications services to users of electronic devices, such as portable imaging apparatus 130. For example, the wireless service provider may be a cellular telephone service provider (such as Sprint Nextel Corporation), a personal communications services (PCS) provider, or a provider of other wireless services. Wireless carrier network 180 may include a wireless server and a network of base stations. Portable imaging apparatus 130 may communicate via the base stations of wireless carrier network 180 with the wireless server of wireless carrier network 180 using a "client-server" software architecture over wireless connection 160. Thus, portable imaging apparatus 130 is able to couple to remote server 140 via wireless carrier network 180.

Figure 2:
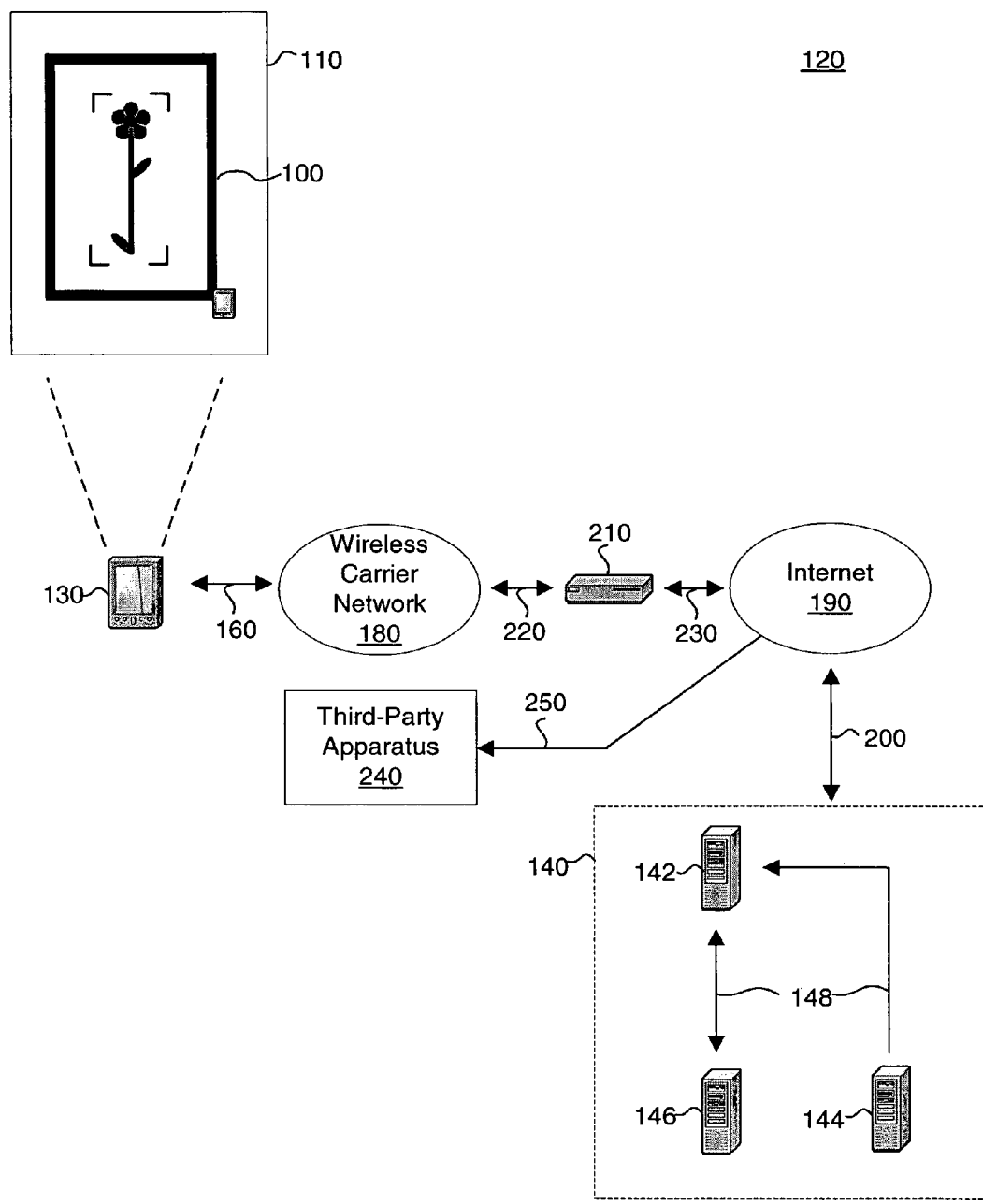
FIG. 2 shows another embodiment of an exemplary content delivery system that includes a portable imaging apparatus and a remote server.

In another exemplary version of content delivery system 120, shown in FIG. 2, remote server 140 may be coupled to internet 190 via a connection 200 and assigned an IP address. Portable imaging apparatus 130 may couple to wireless carrier network 180 via wireless connection 160. An internet gateway 210 is further provided to couple wireless carrier network 180 to internet 190 via connections 220 and 230. Portable imaging apparatus 130 couples to remote server 140 via wireless carrier network 180 and internet 190. For example, a Common Gateway Interface (CGI) script that resides at remote server 140 may be called by portable imaging apparatus 130 to receive the super-image via a Hyper Text Transfer Protocol (HTTP) protocol, and the CGI script may return the information content to portable imaging apparatus 130 via the HTTP protocol.

In one embodiment, portable imaging apparatus 130 couples to remote server 140 via at least one proxy that can couple to remote server 140, such as in lieu of portable imaging apparatus 130 in the embodiments described above. For example, the proxy may comprise a personal computer or docking station. In one embodiment provided for illustrative purposes, portable imaging apparatus 130 is a stand-alone digital camera and the proxy is a personal computer having a docking cradle to receive the digital camera and thereby couple to the digital camera to download the super-image from the digital camera.

Content delivery system 120 may comprise an image processor to process the super-image of pattern 100 to isolate a decodable subsection of the super-image, referred to herein as a sub-image. Content delivery system 120 may further comprise a decoder to decode the sub-image to determine a digital identifier. Content delivery system 120 may also include a content supplier to supply information content in relation to the digital identifier. The image processor, decoder, and content supplier may each be implemented in either portable imaging apparatus 130 or remote server 140.

Delivering the information content may comprise presenting the information content to a user of content delivery system 120. For example, the information content may be transmitted to portable imaging apparatus 130 to be presented at portable imaging apparatus 130, such as on a visual display or on audio speakers. In another example, the information content is transmitted to a third-party apparatus 240 via a connection 250. For example, third-party apparatus 240 can comprise a television, a computer, an animatronic character, a door having a locking mechanism, a vending machine, or a digital video recorder (DVR). In these examples, the information content may be adapted to present a slideshow or video on the television or computer, activate the animatronic character to perform an action, de-activate the locking mechanism on the door, trigger the vending machine to deliver a product, or store a preselected program on the DVR, respectively.

Figure 3:
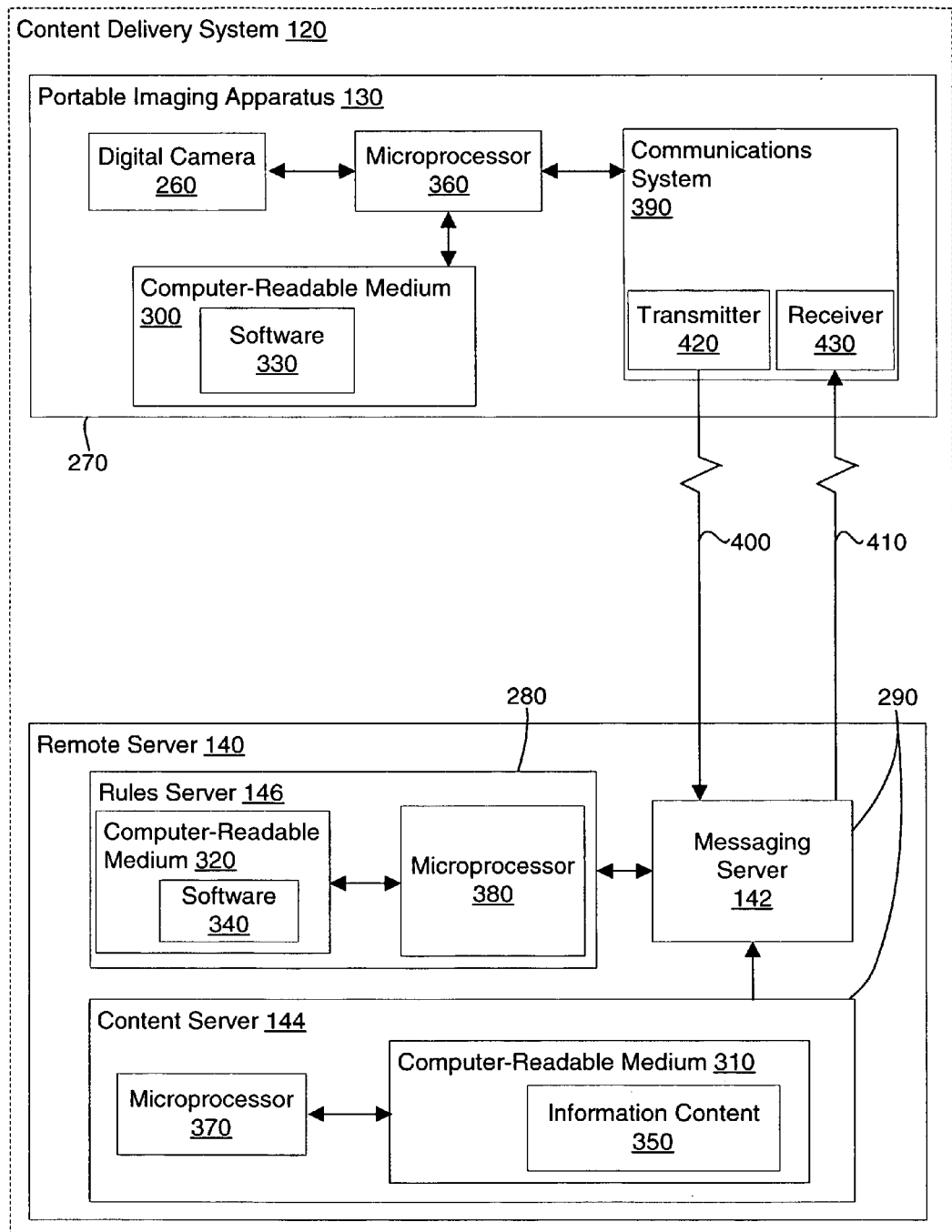
FIG. 3 is a block diagram of an embodiment of an exemplary content delivery system, showing exemplary components of the portable imaging apparatus and the remote server.

FIG. 3 is a block diagram of one exemplary embodiment of content delivery system 120, showing components of portable imaging apparatus 130 and servers 142, 144, and 146 of remote server 140. The digital camera of portable imaging apparatus 130 is shown as digital camera 260. The image processor, decoder, and content supplier are shown implemented in the content delivery system 120 as image processor 270, decoder 280, and content supplier 290.

One or more of portable imaging apparatus 130 and servers 142, 144, and 146 may comprise one or more computer-readable media 300, 310, and 320 to store computer-executable software 330 and 340 and/or data, such as information content 350. The computer-readable media 300, 310, and 320 may comprise one or more of a magnetic hard drive, an optically-readable medium such as a compact disc (CD) or digital video disc (DVD), and solid state memory such as Flash memory. One or more of portable imaging apparatus 130 and servers 142, 144, and 146 may also comprise one or more microprocessors 360, 370, and 380 to execute instructions of software 330 and 340 stored on one or more of computer-readable media 300, 310, and 320. The instructions are executed to configure the microprocessors 360, 370, and 380, such as to perform the functions of image processor 270, decoder 280, and content supplier 290. Microprocessor 360 in portable imaging apparatus 130 may comprise, for example, a DragonBall microprocessor, commercially available from Motorola, Inc., of Schaumberg, Ill., U.S.A. Microprocessors 370 and 380 in one or more of servers 142, 144, and 146 may comprise, for example, a Xeon™ processor, commercially available from Intel Corporation of Santa Clara, Calif., U.S.A.

One or more of image processor 270, decoder 280, and content supplier 290 may be implemented as one or more sets of customized software 330 and 340 stored in one or more of computer-readable media 300, 310, and 320 of portable imaging apparatus 130 or remote server 140. For example, software 340 may be stored in computer-readable medium 320 of remote server 140. Software 330 may have access to one or more application programming interfaces (APIs) that provide an interface to the functionality of digital camera 260 on portable imaging apparatus 130. Software 330 and 340 may be written in any suitable programming language and/or development environment, such as for example Java 2 Micro Edition, Binary Runtime Environment for Wireless, Symbian, or Macromedia Flash Light.

Alternatively or in addition, one or more of image processor 270, decoder 280, and content supplier 290 may be implemented as hardware in portable imaging apparatus 130 or remote server 140. The hardware may comprise electronic circuitry that includes passive and/or active electronic components. For example, the hardware may be implemented in at least one Application Specific Integrated Circuit (ASIC).

In the exemplary embodiment of FIG. 3, for example, portable imaging apparatus 130 comprises computer-readable medium 300 to store software 330, and microprocessor 360 to execute instructions of software 330. Software 330 on portable imaging apparatus 130 may comprise image editing software, which can be used to crop or otherwise edit the super-image captured by digital camera 260. For example, the super-image may be edited according to instructions that have previously been received by the user of portable imaging apparatus 130 or computer-readable instructions that have previously been received by portable imaging apparatus 130. Content server 144 comprises computer-readable medium 310 to store the information content to be delivered, shown as information content 350, and a microprocessor 370. Rules server 146 comprises computer-readable medium 320 to store software 340, and microprocessor 380 to execute instructions of software 340.

In the exemplary embodiment of FIG. 3, image processor 270 may be implemented in software 330 residing on computer-readable medium 300 and executable by microprocessor 360 of portable imaging apparatus 130. Decoder 280 may be implemented in software 340 residing on computer-readable medium 320 and executable by microprocessor 380 of rules server 146. Content supplier 290 may be implemented in hardware of messaging server 142 and content server 144. However, for purposes of the present invention, messaging server 142, content server 144, and rules server 146 may be a single server.

Portable imaging apparatus 130 may further comprise a communications system 390 to transmit data between portable imaging apparatus 130 and remote server 140 via connections 400 and 410. Communications system 390 comprises a transmitter 420 to transmit data from portable imaging device 130 to remote server 140, and may also comprise a receiver 430 to receive data from remote server 140 at portable imaging device 130. For example, if decoder 280 is implemented in remote server 140 to determine the digital identifier remotely, transmitter 420 of communications system 390 may transmit the sub-image, either as part of the super-image or on its own, from portable imaging apparatus 130 to remote server 140. If image processor 270 is also implemented in remote server 140, then transmitter 420 may transmit the super-image to remote server 140 and image processor 270 can isolate the sub-image from the super-image. In one embodiment, communications system 390 is a wireless communications system adapted to communicate wirelessly with remote server 140, transmitter 420 is a wireless transmitter, and receiver 430 is a wireless receiver.

Transmitting the super-image to remote server 140 may refer to transmitting either the full area of the super-image, one or more cropped sections of the super-image, or the super-image after other preselected data have been extracted. For example, the super-image may be cropped by the image editing software of portable imaging apparatus 130 prior to transmission. Also, color information may be removed from the super-image before transmission. By cropping or otherwise removing data from the super-image, content delivery system 120 may be able to more efficiently use transmission bandwidth and data storage resources.

Figure 4:
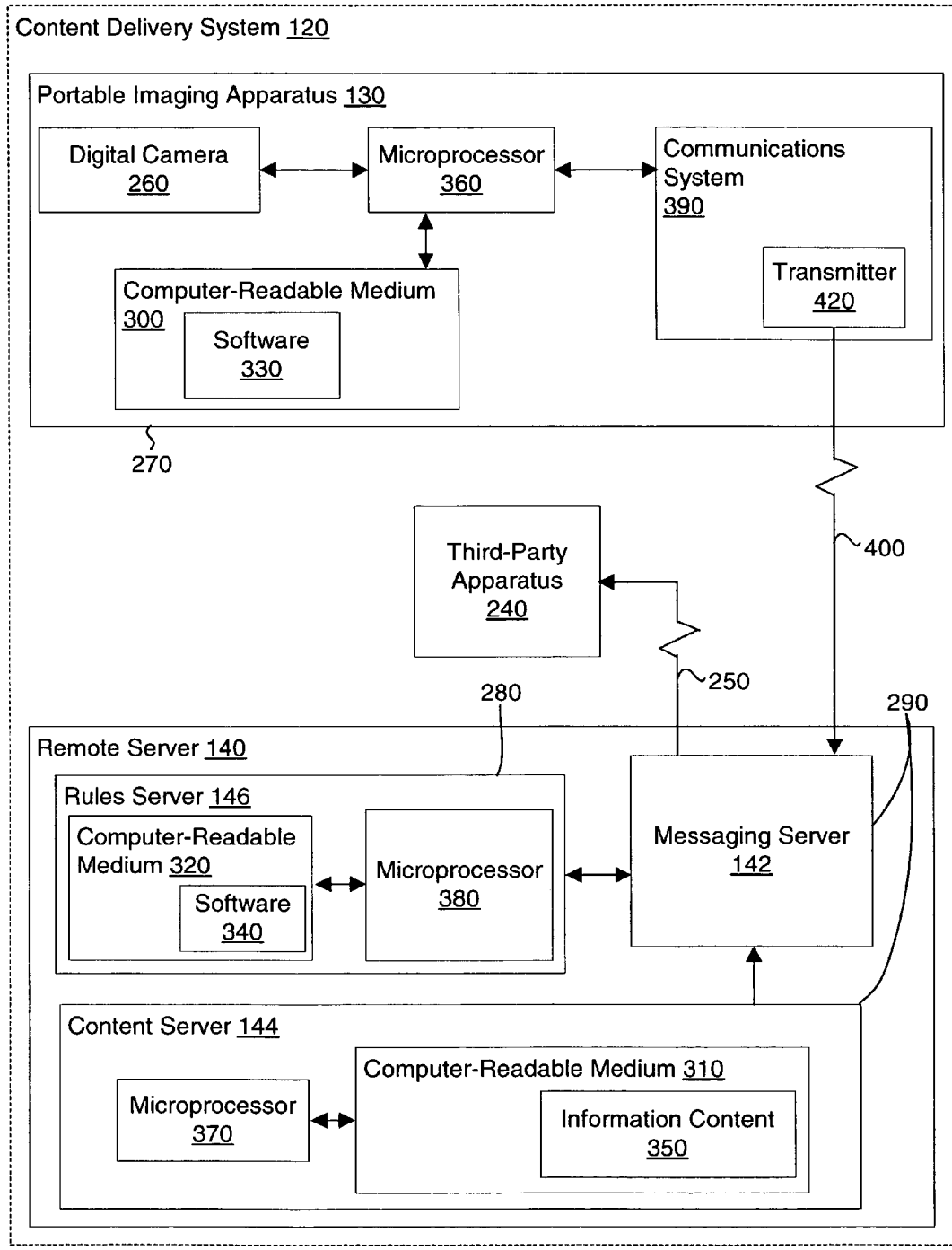
FIG. 4 is a block diagram of another embodiment of an exemplary content delivery system, showing components of the portable imaging apparatus and the remote server.

FIG. 4 is a block diagram of another exemplary embodiment of content delivery system 120. The embodiment of FIG. 4 is adapted to deliver some or all of information content 350 to third-party apparatus 240 via connection 250, instead of to portable imaging apparatus 130. Messaging server 142 transmits information content 350 to third-party apparatus 240 to trigger the desired response.

Figure 5:
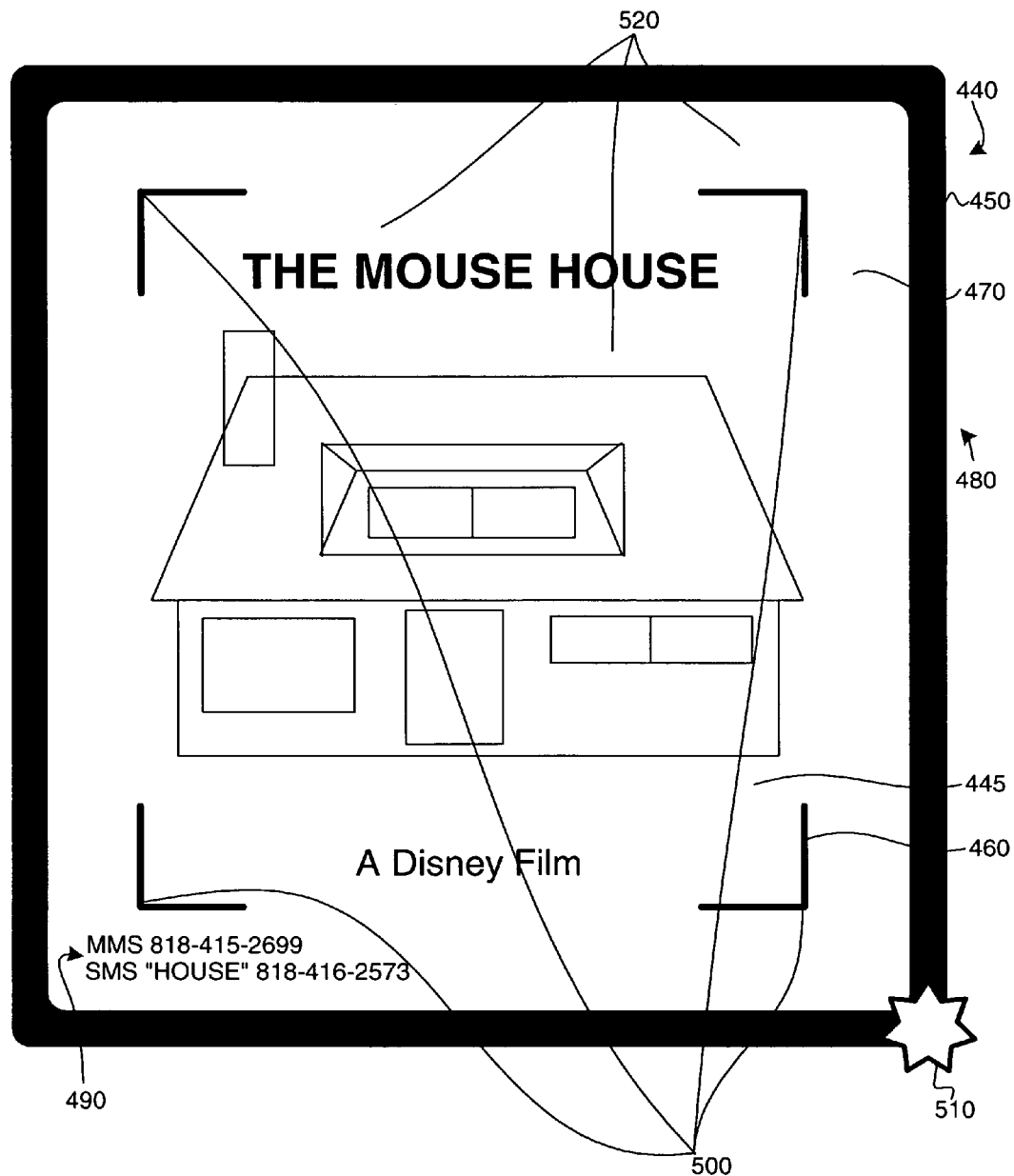
FIG. 5 shows an exemplary super-image that includes a sub-image framed by an outer border and a sub-frame.

Pattern 100 displayed on physical object 110 may be designed such that the super-image captured of pattern 100 comprises a first image, referred to herein as a super-image, containing therein a second image, referred to herein as a sub-image. FIG. 5 shows an exemplary embodiment of a super-image 440 containing a sub-image 445. Super-image 440 may have an outer border 450 that frames a sub-frame 460, which in turn frames sub-image 445. Sub-image 445 can be decoded to determine the digital identifier. A main border 470 may also be provided between outer border 450 and sub-frame 460.

Each of outer border 450 and sub-frame 460 comprises a full or partial design that is optically detectable and sufficiently extensive to define an inner area and an outer area, the inner area being "framed" by the design. Outer border 450 and sub-frame 460 are each optically detectable by having an optical attribute that contrasts with an adjacent area within super-image 440. For example, outer border 450 may comprise a brightness of at least a preselected contrast with an inwardly or outwardly adjacent area 480, such as a substantially dark outer border 450 adjacent to a substantially light area 480. Sub-frame 460 may comprise a brightness of at least a preselected contrast with main border 470, such as substantially dark when main border 470 is substantially light.

In one embodiment, main border 470 may comprise a tag 490 containing text or graphics. For example, tag 490 may comprise one or more of instructions, e-mail, a wireless text address, a telephone number, an MMS address, and a carrier short code to which textual or graphical messages can be sent. Main border 470 is designed to avoid interference with the detection of outer border 450 and sub-frame 460. For example, the pixels that form main border 470 may have an optical attribute with values that fall within a preselected range.

Image processor 270 may process super-image 440 at a first resolution to isolate sub-image 445 in a form that can be robustly decoded. Initially, image processor 270 may detect outer border 450 at the first resolution. Outer border 450 may then be used to locate registration points 500 of super-image 440. For example, based on the location of outer border 450, three or more predetermined non-collinear registration points 500 of super-image 440 may be detected. Registration points 500 may be points of outer border 450 itself, points of main border 470, points of sub-frame 460, or points of sub-image 445 that have an expected location, such as an expected location in relation to points of outer border 450. The actual locations of registration points 500 are compared to expected locations of registration points 500 in super-image 440 to locate sub-frame 460 and to calculate displacement values of registration points 500.

Based on the displacement values of registration points 500, image processor 270 may perform keystone correction of sub-image 445. Keystone correction compensates for shape distortion, artifacts, or other effects that may result from an undesirable angle between a photographic axis that extends from digital camera 260 to pattern 100 on object 110, and a normal axis that is normal to a surface of object 110 at which pattern 100 is displayed. For example, if opposite edges in sub-image 445 are expected to be parallel and the edges are not actually parallel in sub-image 445, sub-image 445 can be adjusted to parallelize the edges and thereby at least partially correct the rest of sub-image 445.

Super-image 440 may also include an orientation icon 510 that image processor 270 can use to determine an angular orientation of sub-image 445 during image processing. For example, icon 510 may be located at sub-frame 460, at main border 470, or at outer border 450. Image processor 270 compensates for an undesirable angular orientation of sub-image 445, such as by computationally rotating sub-image 445. In one embodiment, sub-image 445 is re-oriented according to the position of icon 510 relative to the expected locations of registration points 500 of super-image 440.

After image processing, decoder 280 may receive sub-image 445 and decode sub-image 445 at a second resolution to determine the digital identifier. The second resolution may be lower than the first resolution, whereby the higher first resolution can provide accurate isolation of sub-image 445 while the lower second resolution can provide increased robustness in decoding sub-image 445.

Figure 6A:
FIG. 6a shows an exemplary image captured from a pattern on an object.

FIG. 6a shows an exemplary embodiment of sub-image 445 for another exemplary embodiment of pattern 100. Sub-image 445 comprises pixels 520 that are individually associated with values of a set of at least one optical attribute. For example, the optical attributes may comprise one or more of saturation, hue, or value. In another example, each of pixels 520 has the optical attributes corresponding to the following colors: red intensity, green intensity, and blue intensity. Alternatively, pixels 520 may have the optical attribute of brightness, wherein each pixel 520 is associated with a value to indicate the brightness of pixel 520 along a spectrum, e.g., from dark to light. Each of the optical attributes is associated with a value of pixel 520.

Figure 6B:
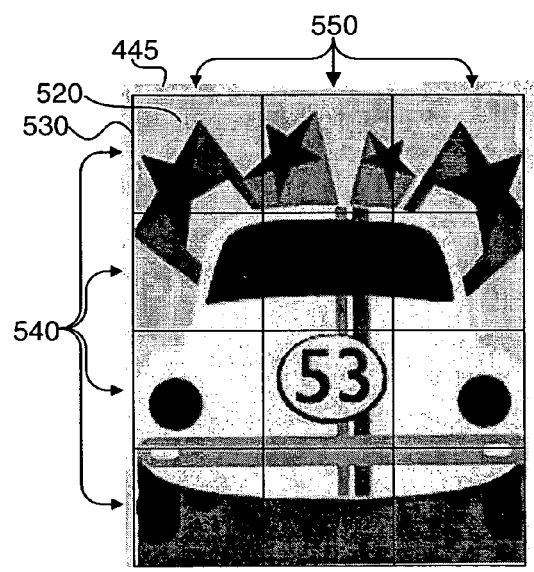
FIG. 6b shows the exemplary image of FIG. 6a, with superimposed grid lines defining tiles.

FIG. 6b shows sub-image 445 of FIG. 6a, wherein decoder 280 has divided sub-image 445 into tiles 530 whose boundaries are shown superimposed on sub-image 445 for illustration purposes. Dividing sub-image 445 into tiles 530 refers to defining tiles 530 such that each of tiles 530 contains a contiguous plurality of pixels 520. Tiles 530 are sets of pixels 520 that may have any individual shape or size, and may include pixels 520 from anywhere in sub-image 445. In one exemplary embodiment, decoder 280 arranges tiles 530 into an array of rows 540 and columns 550. In the example of FIG. 6b, pixels 520 of sub-image 445 are divided by an array of tiles $T_{ij}$ arranged in 4 rows 540 and 3 columns 550, where T ranges from 1 to 4, and 'j' ranges from 1 to 3. Each of the tiles $T_{ij}$ comprises a contiguous set of pixels 520. The second resolution refers to the resolution of tiles 530, such as the product of the number of rows 540 and columns 550.

The first resolution refers to the number of pixels 520 in super-image 440. For example, the first resolution may be from about 80×80 pixels (i.e., about 6,400 pixels) to about 4,000×4,000 pixels (i.e., about 16 megapixels), with any aspect ratio as long as there are from about 80 to about 4,000 pixels in a first dimension and from about 80 to about 4,000 pixels in a second dimension that is substantially orthogonal to the first dimension. The second resolution refers to the number of tiles 530 in sub-image 445. The second resolution may be lower than the first resolution, meaning that the number of tiles 530 in sub-image 445 is less than the number of pixels 520 in super-image 440. For example, the second resolution may be from about 3×3 tiles (i.e., about 9 tiles) to about 200×200 tiles (i.e., about 40,000 tiles). In one exemplary embodiment, provided for the purposes of illustration, the first resolution is about 120×80 pixels and the second resolution is about 3×4 tiles, such that each tile has a resolution of about 40×20 pixels and there are about 12 tiles. In another exemplary embodiment, the first resolution is about 640×480 pixels and the second resolution is about 3×4 tiles.

Figures 7A, 7B:
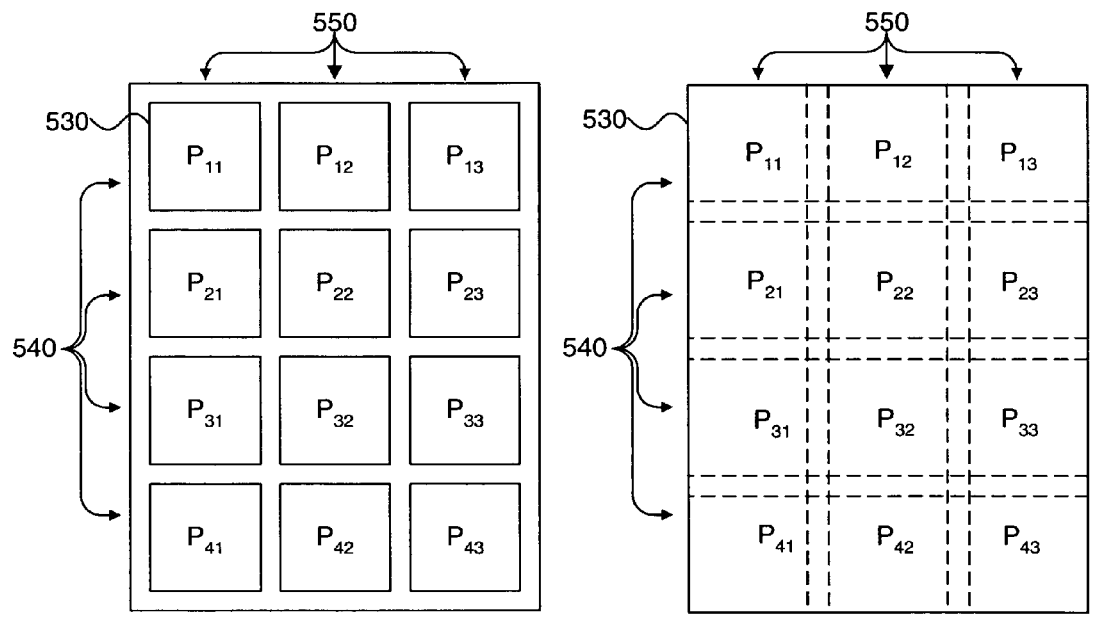
FIG. 7a shows an exemplary layout of non-adjacent tiles.
FIG. 7b shows an exemplary layout of overlapping tiles.

One or more of tiles 530 may be contiguous and non-overlapping, having borders that abut the borders of one or more of the other tiles 530, as shown in the exemplary embodiment of FIG. 6b. One or more of tiles 530 may also separated from other tiles such that one or more of pixels 520 of sub-image 445 are not contained in one of tiles 530, as shown in the exemplary embodiment of FIG. 7a. Furthermore, one or more of tiles 530 may be contiguous and have borders that overlap the borders of one or more of the other tiles 530, such as shown in the exemplary embodiment of FIG. 7b.

Referring to FIG. 6b, decoder 280 evaluates one or more of the optical attributes of pixels 520 in each of tiles 530 to assign one or more digital bits to the evaluated tile 530. For example, each of tiles 530 may correspond to one or more binary bits individually having values of either '0' or '1', or a digital bit that is based on another numeral system, such as a decimal or hexidecimal numeral system. In one exemplary embodiment, the optical attribute of pixels 520 comprises brightness, which may be evaluated by measuring the red intensity, green intensity, and blue intensity of each of pixels 520, and averaging these three intensities.

Figure 8:
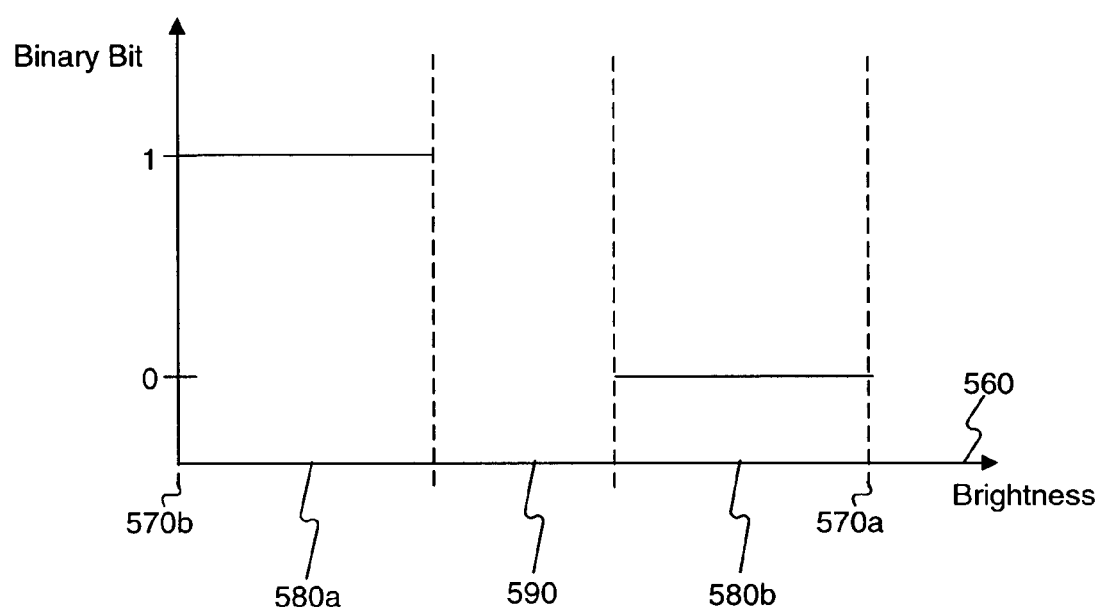
FIG. 8 is a graph showing an exemplary plot of binary bit state as a function of brightness.

Decoder 280 may evaluate the optical attribute of each of pixels 520 along a spectrum of possible values. For example, decoder 280 can determine the distribution of the values associated with pixels 520 for each of the tiles 530. FIG. 8 is an example of a plot of the state of a digital bit as a function of values of an optical attribute along a spectrum 560, where the optical attribute is brightness and the digital bit is a binary bit. Spectrum 560 comprises high and low boundaries, such as the high and low boundaries 570a and 570b, respectively.

Furthermore, one or more ranges of the values of the optical attribute are defined along spectrum 560.

In the exemplary embodiment shown in FIG. 8, two ranges 580a and 580b correspond to brightness values. First range 580a of brightness values is associated with a first state, referred to as '1', of the binary bit. However, second range 580b of brightness values is associated with a second state, referred to as '0', of the binary bit. In another embodiment, the first and second states of the binary bit could be '0' and '1', respectively.

At least two of ranges 580a and 580b may be separated by one or more guard bands, such as the guard band 590 shown in FIG. 8, to improve the robustness of the decoding process, i.e., to increase the reliability of decoding the intended digital identifier. In FIG. 8, for example, guard band 590 is shown separating first and second ranges 580a and 580b. Alternatively, at least two of ranges 580a and 580b need not be separated by a guard band 590, such that those ranges 580a and 580b are adjacent along spectrum 560.

Decoder 280 may normalize sub-image 445 to improve the robustness with which sub-image 445 is decoded. For example, sub-image 445 may be sampled at some or all of pixels 520 to determine a range of actual values of the optical attribute of those pixels. Based on the sampling, either of ranges 580a and 580b of spectrum 560, or the values of pixels 520 of sub-image 445 itself, can be adjusted to provide a better distribution of the values across ranges 580a and 580b for different pixels 520. When the optical attribute is brightness, normalization can compensate, for example, for abnormal lightening or darkening of sub-image 445, such as when pattern 100 is positioned in direct sunlight or in shadow.

In another exemplary embodiment, sub-image 445 comprises pixels 520 that can be assigned brightness values in the spectrum of '0' to '255', where '255' is high boundary 570a and '0' is low boundary 570b. However, upon sampling, all pixels 520 of sub-image 445 actually have brightness values in a spectrum 560 of '0' to '200'. The high and low boundaries 570a and 570b, as well as ranges 580a and 580b, can be adjusted accordingly to improve the robustness with which sub-image 445 is decoded to determine the digital identifier. Alternatively, the values of pixels 520 themselves can be scaled up to a spectrum 560 of '0' to '255'.

Pixels 520 in each of tiles 530 are evaluated to determine their placement in one of ranges 580a and 580b between high and low boundaries 570a and 570b. Based on the distribution among ranges 580a and 580b of the values of the optical attribute across pixels 520 of each of tiles 530, a digital bit can be assigned to tile 530. In addition or alternatively, some of pixels 520 may be discounted from the evaluation process through a process referred to as "pixel decimation."

In one embodiment, decoder 280 may determine a "key" sub-range of ranges 580a and 580b based on the distribution of the values of the optical attribute among ranges 580a and 580b. For example, decoder 280 may calculate the number of pixels 520 in each of ranges 580a and 580b to determine which of ranges 580a and 580b has the highest number of pixels 520. The range having the highest number of pixels 520 is the key sub-range, which determines the digital bit assigned to tile 530. Decoder 280 may associate the binary bit state corresponding with the key sub-range, whether the key range is first range 580a or second range 580b, to individual tile 530. Furthermore, a requirement may be imposed that the key sub-range have a number of the values of the optical attribute corresponding to pixels 520 that exceeds the next highest number of the values corresponding to pixels 520 in any other of ranges 580a and 580b by a preselected number or a preselected percentage, referred to as a "goodness" requirement. In another embodiment, the range having a median of the values of the optical attribute at pixels 520 of tile 530 is the key range.

Referring to FIG. 6b, decoder 280 measures the brightness at each of pixels 520 that is in the tile $T_{11}$. For example, pixels 520 may have brightness values in a spectrum of from about '0' to about '255'. The individual pixels are evaluated to be either "light" or "dark." For example, for brightness values that can range from '0' to '255', pixels having a brightness value in the range from '140' to '255' may be defined as "light" whereas pixels having a brightness value in the range from '0' to '140' may be defined as "dark." If the light pixels outnumber the dark pixels within the tile $T_{ij}$, a bit of '0' is associated with the tile $T_{ij}$. On the other hand, if the dark pixels outnumber the light pixels, a bit of '1' is associated with the tile $T_{ij}$. Since the 12 tiles $T_{ij}$ are individually associated with binary bits, sub-image 445 may be decoded to generate one of $2^{12}$, or 4096, unique digital identifiers.

Figure 9:
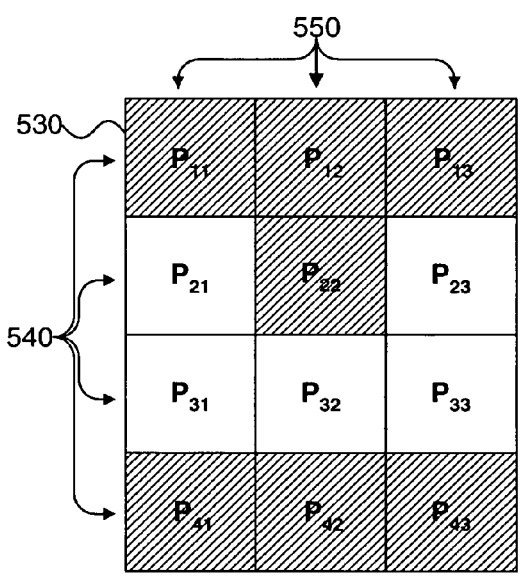
FIG. 9 shows the exemplary image of FIGS. 6a and 6b, represented as individually hatched or unhatched tiles, according to the states of binary bits assigned to the individual tiles.

FIG. 9 shows an example of binary bits, shown as hatched for '0' and not hatched for '1', assigned to tiles 530. In another embodiment, each of tiles 530 is assigned three binary bits: the first of the binary bits recovered from the optical attribute of red intensity, the second of the binary bits recovered from the optical attribute of green intensity, and the third of the binary bits recovered from the optical attribute of blue intensity.

Figure 10:
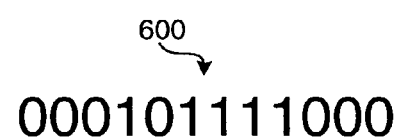
FIG. 10 shows an exemplary digital identifier associated with the binary bits represented in FIG. 9.

Decoder 280 uses the digital bits assigned to tiles 530 to determine a digital identifier. For example, the digital bits may be arranged in sequence to compose the digital identifier as an integer. FIG. 10 shows an exemplary embodiment of a digital identifier 600 for the image of FIGS. 6a and 6b based on the binary bits assigned to tiles 530 as shown in FIG. 9. Digital identifier 600 of FIG. 10 corresponds to the binary bits of FIG. 9 when read left-to-right and top-to-bottom, thus generating digital identifier 600 having a value of '000101111000'. Pattern 100 may be designed such that sub-image 445 can generate one of at least $M^{(i+j)}$ unique digital identifiers when decoded, where M is a base of a digital bit assigned to each of the tiles $T_{ij}$, such as base 2 for a binary numeral system, base 10 for a decimal numeral system, etc.

Decoder 280 may use one or more of the digital bits as a parity bit for error correction of the remaining digital bits. For example, if the digital bits are binary bits, the parity bit may be set to '0' if there are an even number of '1' bits, and the parity bit may be set to '1' if there are an odd number of '1' bits, or vice versa. In an exemplary embodiment, if sub-image 445 is divided into 16 tiles, the first through fifteenth tiles may each represent a single binary bit that contributes to digital identifier 600, while the sixteenth bit corresponding to the sixteenth tile may be the parity bit.

Figure 11:
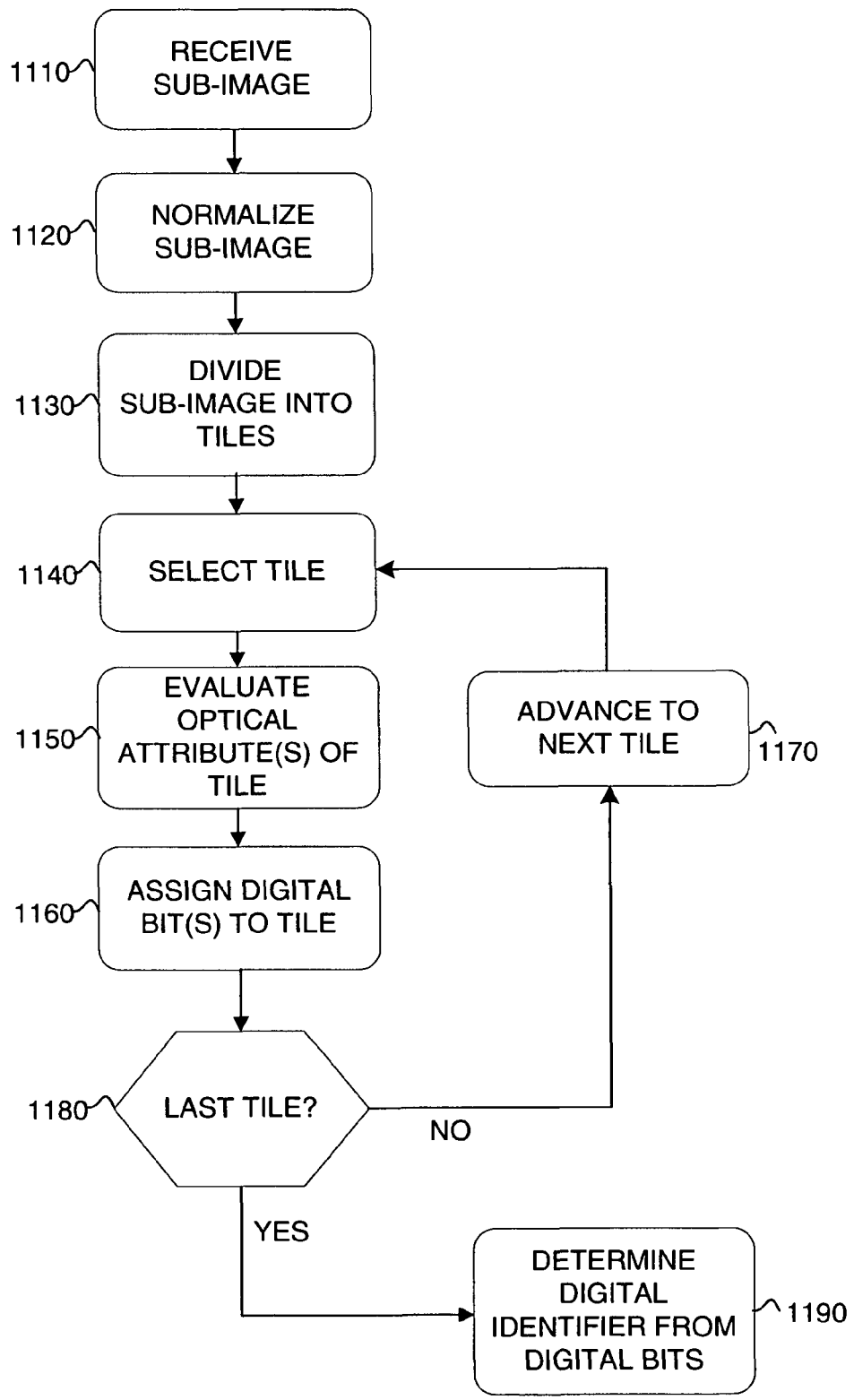
FIG. 11 is a flowchart of an exemplary embodiment of a process of decoding an image to determine a digital identifier.

FIG. 11 is a flowchart of an exemplary embodiment of the decoding process described above. Initially, sub-image 445 is received, such as from image processor 270 or digital camera 260 (step 1110). Sub-image 445 may then be normalized (step 1120). Sub-image 445 is divided into tiles 530 (step 1130). One of tiles 530 is selected (step 1140). One or more optical attributes of the selected tile 530 are evaluated (step 1150). Based on the evaluation of the optical attributes, one or more digital bits, such as individually corresponding to the optical attributes, are assigned to that tile 530 (step 1160). The optical attributes of the remaining tiles 530 are evaluated (step 1170). Once the last tile 530 has been assigned its digital bit (step 1180), digital identifier 600 can be determined from the digital bits (step 1190).

Decoder 280 may look up digital identifier 600 to locate information content 350 associated with digital identifier 600. For example, decoder 280 may associate digital identifier 600 with information content 350 by identifying a location that makes information content 350 accessible. The location may comprise, for example, a memory address, filename, IP address, uniform resource locator (URL), or telephone number.

A mapping between one or more digital identifiers 600 and locations of sets of information content 350 associated with those digital identifiers 600 is provided. For example, the digital identifiers may be mapped to the sets of information content 350 in either a one-to-one relationship or a many-to-one relationship. FIG. 12 is a table showing an exemplary embodiment of a mapping, the table having a column for digital identifiers 600 and another column for the filenames of information content 350. In addition to identifying information content 350, decoder 280 may log digital identifier 600 to maintain a record of decoding instances, such as for marketing purposes.

Decoder 280 may further associate digital identifier 600 with a communication protocol used to deliver information content 350. The communication protocol may comprise, for example, e-mail, multimedia messaging service (MMS), enhanced messaging service (EMS), short messaging service (SMS), WAP push, application push (such as in a Java 2 Platform, Micro Edition push registry), a standard form of telephony, or standard internet protocols such as Transmission Control Protocol (TCP), IP, User Datagram Protocol (UDP), HTTP, and File Transfer Protocol (FTP). Remote server 140 may access the mapping between digital identifiers 600 and the sets of information content 350 and/or communication protocols associated with those digital identifiers 600. Remote server 140 looks up digital identifier 600 in the mapping to find information content 350 associated with digital identifier 600.

If digital identifier 600 is not matched to any set of information content 350, content delivery system 120 can present a failure message to the user that sub-image 445 could not be recognized or that no relevant information was found. Alternatively, sub-image 445 can be transferred to a technician, who may edit and return sub-image 445 or visually extract digital identifier 600 from sub-image 445. In yet another version, a preselected set of information content other than the failure message is delivered when digital identifier 600 cannot be matched.

Image processor 270 and/or decoder 280 may repeatedly process and/or decode, respectively, super-image 440 or sub-image 445 to improve the determination of digital identifier 600. In one illustrative example, the parity bit indicates an error in the digital identifier that is determined as a result of the decoding process. As a result, the image processing or decoding process may be successively altered to attempt to eliminate the error. For example, if object 110 that displays pattern 100 is in an undesirably dark or undesirably bright space, the normalization process described above as part of the decoding process may be re-iterated for different values of ranges 580a and 580b or different values of high and low boundaries 570a and 570b. One or more of the decoding steps may also be re-iterated for different shapes or sizes of tiles 530.

Content supplier 290 uses the location of information content 350 from decoder 280 to retrieve and deliver information content 350. When content supplier 290 is implemented in remote server 140, content supplier 290 may deliver information content 350 by transmitting information content 350 to portable imaging apparatus 130 or third-party apparatus 240. Content supplier 290 may also detect one or more characteristics, such as a device type or capability, of portable imaging apparatus 130 or third-party apparatus 240 to optimize transmission of information content 350.

When content supplier 290 is implemented in remote server 140, content supplier 290 may send information content 350 comprising an activation message, also referred to as a "wake-up" message, to portable imaging apparatus 130. The activation message may comprise, for example, one or more of a message to a push registry on a Java 2 Platform, Micro Edition (J2ME) device or Binary Runtime Environment for Wireless (BREW) device of portable imaging apparatus 130, a TCP/IP message, an HTTP request, a text message, and a UDP packet. Receipt of the activation message may activate portable imaging apparatus 130 to deliver additional preselected information content to the user. For example, portable imaging apparatus 130 may retrieve information content that is locally stored or stored on remote server 140. In one exemplary embodiment, portable imaging apparatus 130 comprises a telephonic device, such as a cell phone, and receipt of the activation messages initiates a telephone call from portable imaging apparatus 130 to a live operator or an automated phone tree.

A plurality of different objects 110 may be designed to encode the same digital identifier 600. This flexibility allows a preselected degree of artistic autonomy in the design of pattern 100 displayed on object 110. For example, a promotion for a new movie could include several different posters displaying different patterns, all of the posters encoding the same digital identifier 600 that can, for example, cause a PDA to load an internet website dedicated to providing multimedia content about the movie.

By adjusting characteristics of tiles 530 or selecting the optical attribute used to determine digital identifier 600, decoder 280 can be made desirably robust and the degree and nature of artistic flexibility can be selected for a given application. For example, characteristics of the tiles 530 such as the number of pixels included in each of tiles 530, or the number, shapes, or locations of tiles 530 in sub-image 445 can be adjusted. Thus, a unique digital identifier 600 can be associated with object 110 while desirably allowing for creative latitude in the design of pattern 100 on object 110.

Performing image processing at the higher first resolution to process super-image 440 and isolate sub-image 445, and then performing decoding of sub-image 445 at the lower second resolution, enhances the robustness of the process by which digital identifier 600 is determined while also permitting substantial artistic flexibility in the design of pattern 100 on object 110.

Although embodiments consistent with the present invention have been described in detail with regard to embodiments thereof, other embodiments are possible. For example, content delivery system 120 may comprise other electronic structures equivalent in function to the illustrative structures herein. It is intended that the specification and examples be considered as exemplary only, with a true scope and spirit of the invention being indicated by the following claims.

What is claimed is:

1. A method of decoding an image of a pattern on an object to determine a digital identifier, the method comprising:
 (a) receiving an image of a pattern on the object, the image comprising a plurality of pixels, each of the pixels having an optical attribute with a corresponding value;
 (b) dividing the image into a plurality of tiles, each of the tiles comprising a contiguous plurality of the pixels of the image;
 (c) defining a plurality of ranges of the value of the optical attribute;

(d) for each of the pixels in each of the tiles:
  determining the value of the optical attribute of the pixel, and
  determining which of the ranges corresponds to the value of the optical attribute of the pixel;
(e) assigning a digital bit to each of the tiles based on the range corresponding to the largest number of values of the optical attribute of the pixels in the tile; and
(f) determining a digital identifier based on the digital bits assigned to the tiles.

2. The method of claim 1, wherein the plurality of ranges are two ranges.

3. The method of claim 1, wherein at least two of the ranges are separated by a guard band.

4. The method of claim 1, wherein the digital bit is a binary bit.

5. The method of claim 1, wherein (a) comprises receiving the image from a portable imaging apparatus.

6. The method of claim 1, wherein (f) comprises arranging the digital bits in a sequence to compose the digital identifier.

7. The method of claim 1, wherein the optical attribute comprises brightness.

8. The method of claim 1, wherein the optical attribute comprises a saturation, hue, or value.

9. The method of claim 1, wherein (b) comprises dividing the image into a plurality of contiguous and non-overlapping tiles.

10. The method of claim 1, wherein (b) comprises dividing the image into a two-dimensional array of tiles, the array having from about 2 to about 15 rows, and from about 2 to about 15 columns.

11. The method of claim 1, wherein (b) comprises dividing the image into a plurality of non-adjacent tiles.

12. The method of claim 1, wherein (b) comprises dividing the image into a plurality of overlapping tiles.

13. A system for decoding an image of a pattern on an object to determine a digital identifier, the system comprising:
  a digital camera to generate an image of a pattern on the object, the image comprising a plurality of pixels, each of the pixels having an optical attribute with a corresponding value; and
  a decoder to:
  (i) divide the image into a plurality of tiles, each of the tiles comprising a contiguous plurality of the pixels of the image,
  (ii) define a plurality of ranges of the value of the optical attribute,
  (iii) for each of the pixels in each of the tiles:
    determine the value of the optical attribute of the pixel, and
    determine which of the ranges corresponds to the value of the optical attribute of the pixel,
  (iv) assign a digital bit to each of the tiles based on the range corresponding to the largest number of values of the optical attribute of the pixels in the tile, and
  (v) determine a digital identifier based on the digital bits assigned to the tiles.

14. The system of claim 13, wherein the plurality of ranges are two ranges.

15. The system of claim 13, wherein at least two of the ranges are separated by a guard band.

16. The system of claim 13, wherein the digital bit is a binary bit.

17. The system of claim 13, wherein the decoder arranges the digital bits in a sequence to compose the digital identifier.

18. The system of claim 13, wherein the optical attribute comprises brightness.

19. The system of claim 13, wherein the optical attribute comprises saturation, hue, or value.

20. The system of claim 13, wherein the decoder divides the image into a plurality of contiguous and non-overlapping tiles of the image.

21. The system of claim 13, wherein the decoder divides the image into a two-dimensional array of tiles, the array having from about 2 to about 15 rows, and from about 2 to about 15 columns.

22. The system of claim 13, wherein the decoder divides the image into a plurality of non-adjacent tiles of the image.

23. The system of claim 13, wherein the decoder divides the image into a plurality of overlapping tiles of the image.

24. A non-transitory computer-readable medium containing instructions for configuring a microprocessor to perform a method for decoding an image of a pattern on an object to determine a digital identifier, the method comprising:
  (a) receiving an image of a pattern on the object, the image comprising a plurality of pixels, each of the pixels having an optical attribute with a corresponding value;
  (b) dividing the image into a plurality of tiles, each of the tiles comprising a contiguous plurality of the pixels of the image;
  (c) defining a plurality of ranges of the value of the optical attribute;
  (d) for each of the pixels in each of the tiles:
    determining the value of the optical attribute of the pixel, and
    determining which of the ranges corresponds to the value of the optical attribute of the pixel;
  (e) assigning a digital bit to each of the tiles based on the range corresponding to the largest number of values of the optical attribute of the pixels in the tile; and
  (f) determining a digital identifier based on the digital bits assigned to the tiles.

25. A method of decoding an image of a pattern on an object to determine a digital identifier, the method comprising:
  (a) receiving an image of a pattern on the object, the image comprising a plurality of pixels, each of the pixels having an optical attribute with a corresponding value;
  (b) transmitting the image to a remote server that:
    (i) divides the image into a plurality of tiles, each of the tiles comprising a contiguous plurality of the pixels of the image,
    (ii) defines a plurality of ranges of the value of the optical attribute
    (iii) for each of the pixels in each of the tiles:
      determines the value of the optical attribute of the pixel, and
      determines which of the ranges corresponds to the value of the optical attribute of the pixel,
    (iv) assigns a digital bit to each of the tiles based on the range corresponding to the largest number of values of the optical attribute of the pixels in the tile, and
    (v) determines a digital identifier based on the digital bits assigned to the tiles; and
  (c) receiving the digital identifier from the remote server.

26. The method of claim 25, wherein the plurality of ranges are two ranges.

27. The method of claim 25, wherein at least two of the ranges are separated by a guard band.

28. The method of claim 25, wherein the digital bit is a binary bit.

29. The method of claim 25, wherein the remote server arranges the digital bits in a sequence to compose the digital identifier.

30. The method of claim 25, wherein the optical attribute comprises brightness.

31. The method of claim 25, wherein the optical attribute comprises a saturation, hue, or value.

32. The method of claim 25, wherein the remote server divides the image into a plurality of contiguous and non-overlapping tiles.

33. The method of claim 25, wherein the remote server divides the image into a two-dimensional array of tiles, the array having from about 2 to about 15 rows, and from about 2 to about 15 columns.

34. The method of claim 25, wherein the remote server divides the image into a plurality of non-adjacent tiles.

35. The method of claim 25, wherein the remote server divides the image into a plurality of overlapping tiles.

36. A system for decoding an image of a pattern on an object to determine a digital identifier, the system comprising:
 a digital camera to generate an image of a pattern on the object, the image comprising a plurality of pixels, each of the pixels having an optical attribute with a corresponding value;
 a transmitter to transmit the image to a remote server that:
 (i) divides the image into a plurality of tiles, each of the tiles comprising a contiguous plurality of the pixels of the image,
 (ii) defines a plurality of ranges of the value of the optical attribute,
 (iii) for each of the pixels in each of the tiles:
  determines the value of the optical attribute of the pixel, and
  determines which of the ranges corresponds to the value of the optical attribute of the pixel,
 (iv) assigns a digital bit to each of the tiles based on the range corresponding to the largest number of values of the optical attribute of the pixels in the tile, and
 (v) determines a digital identifier based on the digital bits assigned to the tiles; and
 a receiver to receive the digital identifier from the remote server.

37. The system of claim 36, wherein the plurality of ranges are two ranges.

38. The system of claim 36, wherein at least two of the ranges are separated by a guard band.

39. The system of claim 36, wherein the digital bit is a binary bit.

40. The system of claim 36, wherein the remote server arranges the digital bits in a sequence to compose the digital identifier.

41. The system of claim 36, wherein the optical attribute comprises brightness.

42. The system of claim 36, wherein the optical attribute comprises a saturation, hue, or value.

43. The system of claim 36, wherein the remote server divides the image into a plurality of contiguous and non-overlapping tiles.

44. The system of claim 36, wherein the remote server divides the image into a two-dimensional array of tiles, the array having from about 2 to about 15 rows, and from about 2 to about 15 columns.

45. The system of claim 36, wherein the remote server divides the image into a plurality of non-adjacent tiles.

46. The system of claim 36, wherein the remote server divides the image into a plurality of overlapping tiles.

47. A non-transitory computer-readable medium containing instructions for configuring a microprocessor to perform a method for decoding an image of a pattern on an object to determine a digital identifier, the method comprising:
 (a) receiving an image of a pattern on the object, the image comprising a plurality of pixels, each of the pixels having an optical attribute with a corresponding value;
 (b) transmitting the image to a remote server that:
 (i) divides the image into a plurality of tiles, each of the tiles comprising a contiguous plurality of the pixels of the image,
 (ii) defines a plurality of ranges of the value of the optical attribute
 (iii) for each of the pixels in each of the tiles:
  determines the value of the optical attribute of the pixel, and
  determines which of the ranges corresponds to the value of the optical attribute of the pixel,
 (iv) assigns a digital bit to each of the tiles based on the range corresponding to the largest number of values of the optical attribute of the pixels in the tile, and
 (v) determines a digital identifier based on the digital bits assigned to the tiles; and
 (c) receiving the digital identifier from the remote server.

48. A method of decoding an image of a pattern on an object to determine a digital identifier, the method comprising:
 (a) receiving, from a portable imaging apparatus, an image of a pattern on the object, the image comprising a plurality of pixels, each of the pixels having an optical attribute with a corresponding value;
 (b) dividing the image into a plurality of tiles, each of the tiles comprising a contiguous plurality of the pixels of the image;
 (c) defining a plurality of ranges of the value of the optical attribute;
 (d) for each of the pixels in each of the tiles:
  determining the value of the optical attribute of the pixel, and
  determining which of the ranges corresponds to the value of the optical attribute of the pixel;
 (e) assigning a digital bit to each of the tiles based on the range corresponding to the largest number of values of the optical attribute of the pixels in the tile; and
 (f) determining a digital identifier based on the digital bits assigned to the tiles.

49. The method of claim 48, wherein the plurality of ranges are two ranges.

50. The method of claim 48, wherein at least two of the ranges are separated by a guard band.

51. The method of claim 48, wherein the digital bit is a binary bit.

52. The method of claim 48, wherein (f) comprises arranging the digital bits in a sequence to compose the digital identifier.

53. The method of claim 48, wherein the optical attribute comprises brightness.

54. The method of claim 48, wherein the optical attribute comprises a saturation, hue, or value.

55. The method of claim 48, wherein (b) comprises dividing the image into a plurality of contiguous and non-overlapping tiles.

56. The method of claim 48, wherein (b) comprises dividing the image into a two-dimensional array of tiles, the array having from about 2 to about 15 rows, and from about 2 to about 15 columns.

57. The method of claim 48, wherein (b) comprises dividing the image into a plurality of non-adjacent tiles.

58. The method of claim 48, wherein (b) comprises dividing the image into a plurality of overlapping tiles.

59. A system for decoding an image of a pattern on an object to determine a digital identifier, the system comprising:
- a receiver to receive, from a portable imaging apparatus, an image of a pattern on the object, the image comprising a plurality of pixels, each of the pixels having an optical attribute with a corresponding value; and
- a decoder to:
  - (i) divide the image into a plurality of tiles, each of the tiles comprising a contiguous plurality of the pixels of the image,
  - (ii) define a plurality of ranges of the value of the optical attribute,
  - (iii) for each of the pixels in each of the tiles:
    - determine the value of the optical attribute of the pixel, and
    - determine which of the ranges corresponds to the value of the optical attribute of the pixel,
  - (iv) assign a digital bit to each of the tiles based on the range corresponding to the largest number of values of the optical attribute of the pixels in the tile, and
  - (v) determine a digital identifier based on the digital bits assigned to the tiles.

60. The system of claim 59, wherein the plurality of ranges are two ranges.

61. The system of claim 59, wherein at least two of the ranges are separated by a guard band.

62. The system of claim 59, wherein the digital bit is a binary bit.

63. The system of claim 59, wherein the decoder arranges the digital bits in a sequence to compose the digital identifier.

64. The system of claim 59, wherein the optical attribute comprises brightness.

65. The system of claim 59, wherein the optical attribute comprises a saturation, hue, or value.

66. The system of claim 59, wherein the decoder divides the image into a plurality of contiguous and non-overlapping tiles.

67. The system of claim 59, wherein the decoder divides the image into a two-dimensional array of tiles, the array having from about 2 to about 15 rows, and from about 2 to about 15 columns.

68. The system of claim 59, wherein the decoder divides the image into a plurality of non-adjacent tiles.

69. The system of claim 59, wherein the decoder divides the image into a plurality of overlapping tiles.

70. A non-transitory computer-readable medium containing instructions for configuring a microprocessor to perform a method for decoding an image of a pattern on an object to determine a digital identifier, the method comprising:
- (a) receiving, from a portable imaging apparatus, an image of a pattern on the object, the image comprising a plurality of pixels, each of the pixels having an optical attribute with a corresponding value;
- (b) dividing the image into a plurality of tiles, each of the tiles comprising a contiguous plurality of the pixels of the image;
- (c) defining a plurality of ranges of the value of the optical attribute;
- (d) for each of the pixels in each of the tiles:
  - determining the value of the optical attribute of the pixel, and
  - determining which of the ranges corresponds to the value of the optical attribute of the pixel;
- (e) assigning a digital bit to each of the tiles based on the ramie corresponding to the largest number of values of the optical attribute of the pixels in the tile; and
- (f) determining a digital identifier based on the digital bits assigned to the tiles.

\* \* \* \* \*